(12) United States Patent
Ikeda et al.

(10) Patent No.: US 7,079,909 B2
(45) Date of Patent: Jul. 18, 2006

(54) INFORMATION PROCESSING METHOD AND APPARATUS FOR DEPOSITION

(75) Inventors: Mitsuru Ikeda, Atsugi (JP); Masato Honda, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 383 days.

(21) Appl. No.: 10/742,859

(22) Filed: Dec. 23, 2003

(65) Prior Publication Data

US 2004/0153192 A1   Aug. 5, 2004

(30) Foreign Application Priority Data

Jan. 31, 2003   (JP) ............................... 2003-022938

(51) Int. Cl.
  *G06F 19/00* (2006.01)
(52) U.S. Cl. .................. 700/98; 700/159; 700/160
(58) Field of Classification Search .................. 700/98, 700/159–160, 163, 182, 187
See application file for complete search history.

(56) References Cited

U.S. PATENT DOCUMENTS 6,459,952 B1 * 10/2002 Dundorf .................. 700/182
6,647,314 B1 * 11/2003 Kato et al. .................. 700/159

* cited by examiner

*Primary Examiner*—Paul Dinh
(74) *Attorney, Agent, or Firm*—Staas & Halsey LLP (57) ABSTRACT

An object of this invention is to enable to appropriately carry out deposition due to a design change of an object. This invention comprises the steps of: calculating a difference between three dimensional data representing a form of an object before a design change and three dimensional data representing a form of the object after the design change; and generating deposition data for a shortage portion in the form of the object before the design change by using the calculated difference data, when cutting the object to make the form after the design change. Thus, it is possible to correctly grasp information concerning the deposition necessary to machine the object to make the form after the design change, and to avoid waste of deposition material and cutting work after the deposition. Moreover, this invention may further comprise a step of calculating a region for one or a plurality of deposition layers based on an attribute of a deposition material. Because the maximum thickness of one deposition layer or the like differs according to the attribute of the deposition material, it is useful in the deposition process to obtain regional information for each layer when the deposition is carried out by putting the deposition layers on top of each other.

33 Claims, 10 Drawing Sheets

INFORMATION PROCESSING METHOD AND APPARATUS FOR DEPOSITION

TECHNICAL FIELD OF THE INVENTION

This invention relates to information processing technology for deposition in machining.

BACKGROUND OF THE INVENTION

In the machining of an object such as a metal mold, once a design change occurs after the metal mold was made, it is general that the deposition is carried out for shortage portions of the material in the metal mold, and, by using Computer Aided Design (CAD) data after the design change, the machining is carried out for the changed portions by a Numerical Control (NC) machine or the like. Incidentally, because the material used for the deposition in the metal mold machining have high hardness, compared with the machining the base material such as cast, it takes time of several times to machine the portion at which the deposition was carried out.

On the other hand, when the deposition was carried out, because it was not accurately known how much amount of deposition should be carried out to what portions, the deposition with a lot of margin including a cutting allowance (also called cutting margin), that is, the deposition with too large margin was carried out. Therefore, the waste of the deposition material and machining time after the deposition occurred.

SUMMARY OF THE INVENTION

Therefore, an object of this invention is to provide information processing technology for carrying out the appropriate deposition.

An information processing method according to this invention comprises a first step of calculating a difference between three dimensional data representing a form of an object before a design change and three dimensional data representing a form of the object after the design change; and a second step of generating deposition data for a shortage portion in the form of the object before the design change by using the calculated difference data, when machining (or cutting) the object to make the form after the design change.

Thus, it is possible to correctly grasp information concerning the deposition necessary to machine the object to make the form after the design change, and to avoid waste of the deposition material and machining work after the deposition.

In addition, the aforementioned second step may comprise a step of calculating a deposition region including a cutting allowance calculated based on the difference data. Thus, it becomes possible to set an appropriate amount of cutting allowance, and to avoid waste of the deposition material and machining work after the deposition.

Moreover, the aforementioned second step may comprise a layer region calculating step of calculating a region of one or a plurality of deposition layers based on an attribute of a deposition material. Because the maximum thickness of one deposition layer or the like differs according to the attribute of the deposition material, it is useful in the deposition process to obtain regional information for each layer when the deposition is carried out by putting the deposition layers on top of each other.

Furthermore, in the aforementioned layer region calculating step, the region of one or a plurality of deposition layers may be calculated according to a deposition method in which the deposition layers are put on top of each other from a surface of the object before the design change in the normal direction.

Moreover, in the aforementioned layer region calculating step, the region of one or a plurality of deposition layers may be calculated according to a deposition method in which the deposition layers are put on top of each other in parallel to a specific reference plane.

In addition, this invention may further comprise a step of generating data of a deposition instruction diagram based on the deposition data. Thus, a person in charge of the deposition work can appropriately carry out the deposition work according to the deposition instruction diagram.

Moreover, this invention may further comprise a step of generating data for an automatic deposition machine based on the deposition data. Thus, the automatic deposition machine can appropriately carry out appropriate deposition processing based on the data for the automatic deposition machine.

Furthermore, the aforementioned second step may further comprise a step of calculating deposition path data for the region of the deposition layer according to a deposition method in which the deposition is carried out in parallel by a predetermined deposition width. Thus, it is possible to deposit the region of the deposition layer in a stripe manner.

In addition, the aforementioned second step may further comprise a step of calculating deposition path data for the region of the deposition layer according to a deposition method in which the deposition is carried out so as to form rings with a predetermined width. Thus, it is possible to deposit the region of the deposition layer so as to draw rings.

Incidentally, it is also possible to create a program for carrying out a method according to this invention, and the program is stored in a storage medium or a storage device, for example, a flexible disk, a CD-ROM, a magneto-optical disk, a semiconductor memory, or a hard disk. Besides, there is also a case where the program is distributed as digital signals through a network. Incidentally, data under processing are temporarily stored in a memory of the computer.

DETAILED DESCRIPTION OF THE PREFERRED EMBODIMENTS

Figure 1:
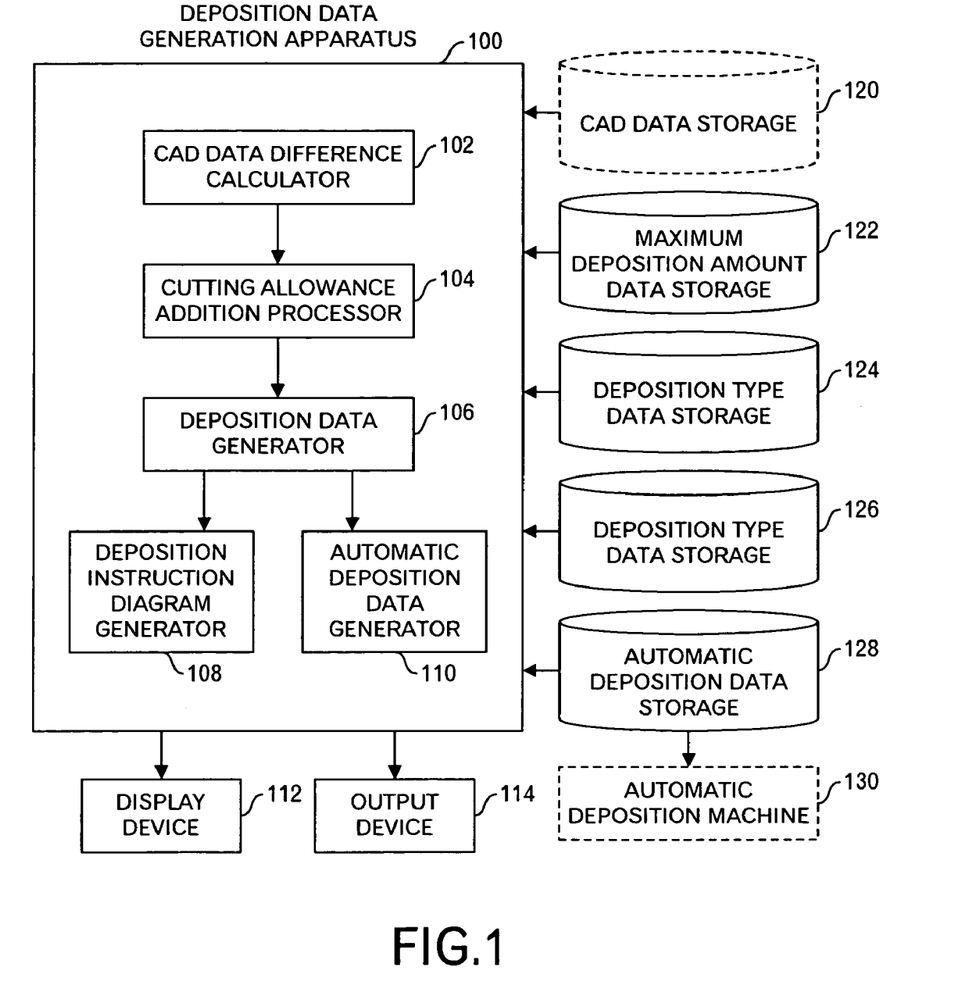
FIG. 1 is a functional block diagram in an embodiment of this invention.

FIG. 1 shows a functional block diagram of a deposition data generation apparatus 100 according to one embodiment of this invention. The deposition data generation apparatus 100 is a computer such as a personal computer or workstation, and includes a central processing unit, memory, file storage, and the like (not shown in FIG. 1). Moreover, the deposition data generation apparatus 100 includes a CAD data difference calculator 102, cutting allowance addition processor 104, deposition data generator 106, deposition instruction diagram generator 108, and automatic deposition data generator 110.

In addition, the deposition data generation apparatus 100 is connected to a display device 112, output device 114 such as a printer or plotter, input device (not shown), CAD data storage 120, maximum deposition amount data storage 122, deposition type data storage 124, deposition type data storage 126, and automatic deposition data storage 128. Incidentally, the CAD data storage 120 is managed by a CAD system (not shown) or the like, and is connected via a network such as a Local Area Network (LAN) with the deposition data generation apparatus 100. Furthermore, the automatic deposition data storage 128 is also connected with an automatic deposition machine 130.

CAD data before and after the design change is stored in the CAD data storage 120, and it is referenced by the CAD data difference calculator 102 in the deposition data generation apparatus 100. The processing result of the CAD data difference calculator 102 is output to the cutting allowance addition processor 104, and the processing result of the cutting allowance addition processor 104 is output to the deposition data generator 106.

Data concerning patterns to put deposition layers on top of each other is stored in the deposition type data storage 124, and data concerning deposition methods for each deposition layer is stored in the deposition type data storage 126. The details will be described later. And, data stored in the deposition type data storage 124 is referenced by the CAD data difference calculator 102 and deposition data generator 106. In addition, data stored in the maximum deposition amount data storage 122 and data stored in the deposition type data storage are referenced by the deposition data generator 106.

The processing result of the deposition data generator 106 is output to the deposition instruction diagram generator 108 and automatic deposition data generator 110. The processing result of the deposition instruction diagram generator 108 is transmitted to the output device 114, and the processing result of the automatic deposition data generator 110 is stored in the automatic deposition data storage 128. Then, data stored in the automatic deposition data storage 128 is referenced by the automatic deposition machine 130. Incidentally, data used or generated in each processing step by the deposition data generation apparatus 100 may be properly displayed on the display device 112.

Next, a processing flow of the deposition data generation apparatus 100 shown in FIG. 1 will be explained by using FIG. 2. For example, in the metal mold machining, once the design change occurs after the metal mold has been made, the deposition data generation apparatus 100 accepts inputs of data (for example, codes) concerning the deposition material for the deposition due to the design change, deposition type, and automatic deposition type via the input device (not shown) or the like, and stores them into the storage device (step S1).

Then, the deposition data generation apparatus 100 obtains CAD data before the design change for the metal mold from the CAD data storage 120, and stores it into the storage device (step S3). In addition, the deposition data generation apparatus 100 obtains CAD data after the design change for the metal mold from the CAD data storage 120, and stores it into the storage device (step S5). It is also possible to designate the CAD data before and after the design change by using the input device or the like.

Figure 3A:
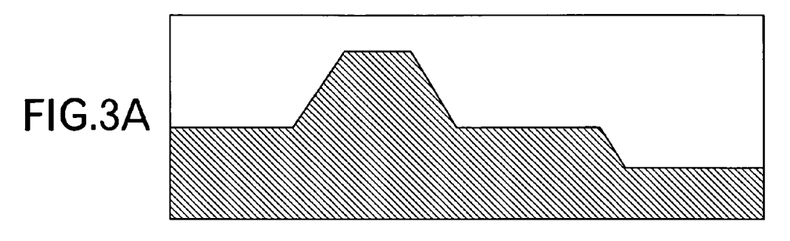
FIGS. 3A and 3B are diagrams showing examples of forms represented by CAD data.
Figure 3B:
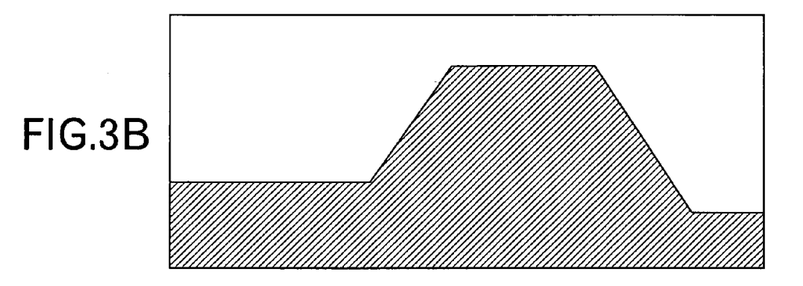

FIGS. 3A and 3B show cross section examples of forms represented by the CAD data. In the figures used in the subsequent explanation, two-dimensional examples (e.g. cross sections) are shown to simplify the explanation. However, three-dimensional data is actually used to carry out the same processings.

FIG. 3A shows an example of the CAD data before the design change. In this example, a form is shown in which there is the highest portion like a hill on the slightly left side from the center of this figure, and the height is lowered stepwise toward the right side.

Moreover, FIG. 3B shows an example of the CAD data after the design change. In this example, a form is shown in which there is the highest portion like a hill on the slightly right side from the center of this figure. Though the details will be explained later, compared with FIGS. 3A and 3B, it can be understood that the deposition should be carried out for a portion in which the contour of the form shown in FIG. 3B, which is represented by the geometric data after the design change, is higher than that shown in FIG. 3A, that is, a portion on the right side from the center of the figure.

Figure 2:
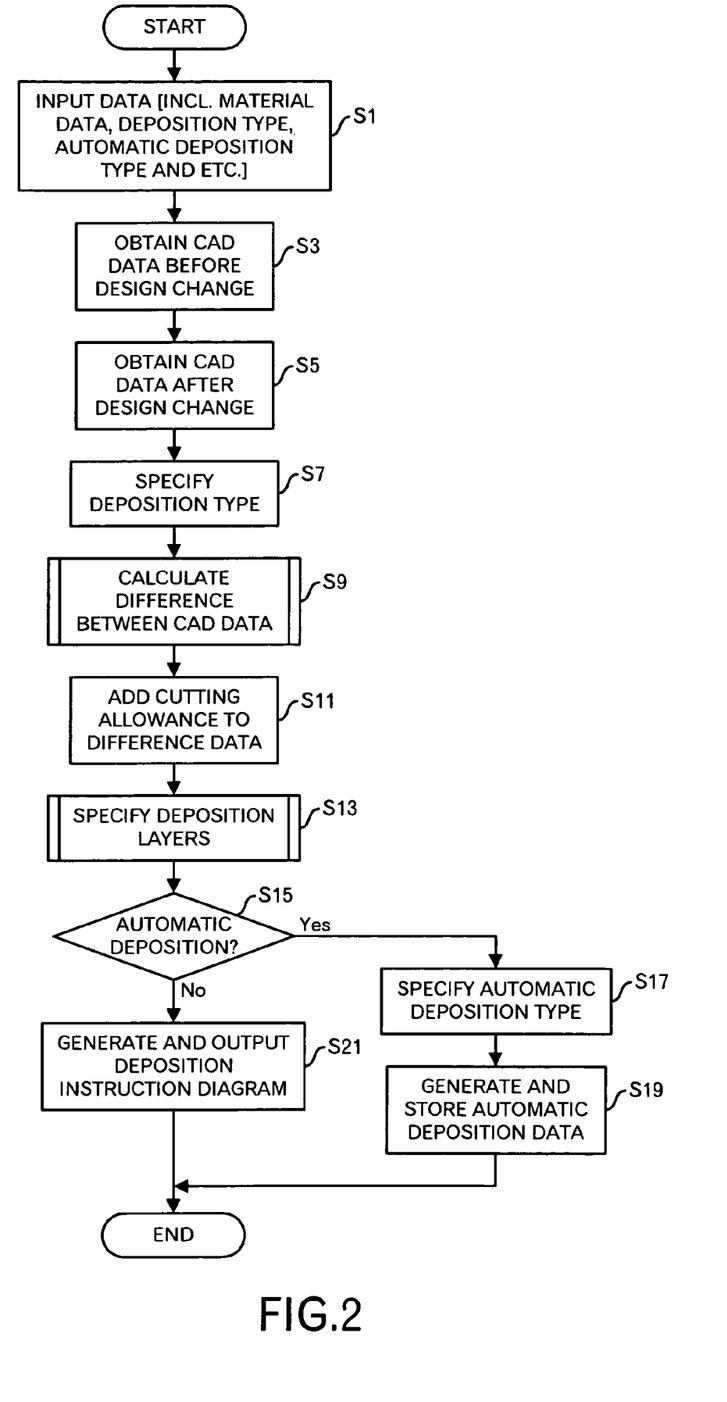
FIG. 2 is a diagram showing a processing flow in the embodiment of this invention.

Returning to the processing flow in FIG. 2, the CAD data difference calculator 102 of the deposition data generation apparatus 100 retrieves the deposition type data storage 124 by using a code of the deposition type, which is accepted at the step S1, and specifies data of the deposition type (step S7). In this embodiment, there are two deposition types, and either of the deposition types is specified.

Figure 4A:
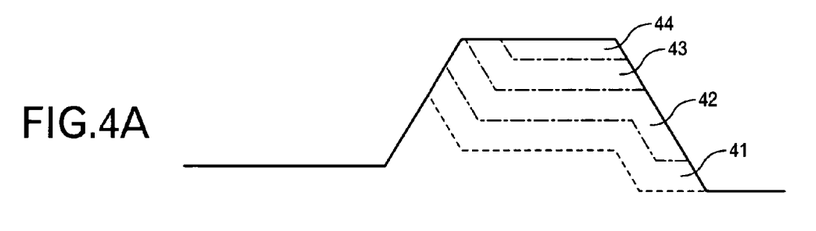
FIGS. 4A and 4B are diagrams showing deposition types.
Figure 4B:
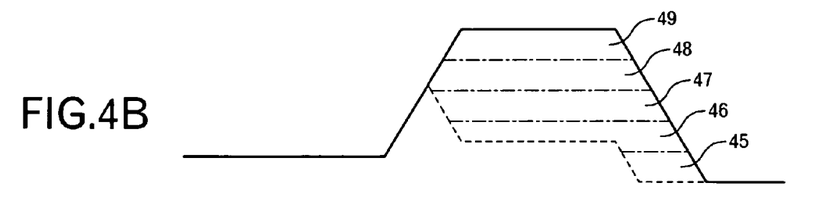

FIGS. 4A and 4B show conceptual figures to explain the deposition types, which can be designated in this embodiment. FIGS. 4A and 4B show a cross section of a deposition region. In both figures, a portion surrounded by a dotted line representing a surface of the metal mold before the design change and a solid line representing a surface of the metal mold after the design change is a region in which the deposition is carried out. In addition, boundaries between the deposition layers are indicated by chain lines.

FIG. 4A shows a first deposition layer 41, second deposition layer 42, third deposition layer 43, and fourth deposition layer 44. In the actual deposition work, the deposition is carried out from the first deposition layer 41 so as to put layers on top of each other. That is, FIG. 4A shows an example of the first deposition type in which the deposition layers are put on top of each other in the normal direction from the surface of the metal mold before the design change.

FIG. 4B shows a first deposition layer 45, second deposition layer 46, third deposition layer 47, fourth deposition layer 48, and fifth deposition layer 49. In the actual deposition work, the deposition is carried out from the first layer 45 so as to put layers on top of each other. That is, FIG. 4B shows an example of the second deposition type in which the deposition layers are put on top of each other horizontally.

Thus, even when the deposition is carried out for the same region, attributes such as a shape and size of each deposition layer differ according to the deposition type.

Returning to the explanation of FIG. 2, the CAD data difference calculator 102 calculates a difference between the CAD data after the design change and the CAD data before the design change based on the deposition type data (step S9). Because a difference calculation method is selected based on the deposition type, the deposition type data is used in the difference calculation. Though the details of the difference calculation method will be explained later, a difference model of the CAD data is specified as the calculation result.

Next, the cutting allowance addition processor 104 adds data for the cutting allowance (also called cutting margin) to the difference model, which is the processing result of the CAD data difference calculator 102, to generate data for the deposition region (step S11).

Figure 5:
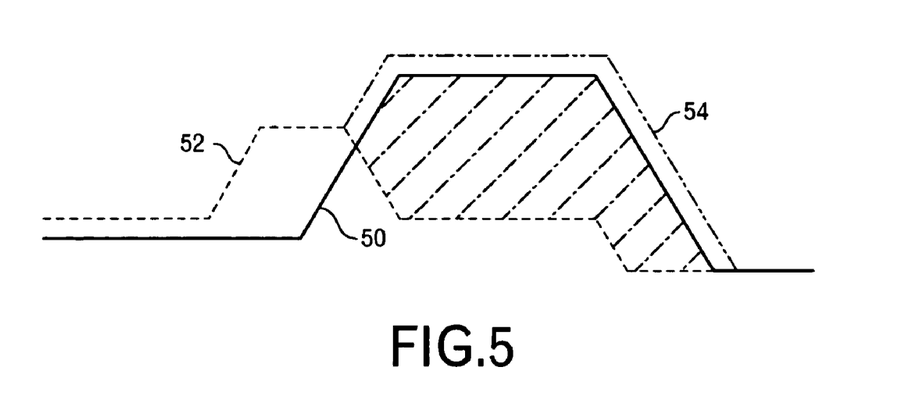
FIG. 5 is a conceptual diagram of a deposition region.

FIG. 5 shows a conceptual figure of the deposition region. FIG. 5 is a figure (i.e. cross section) that shows a state overlapping the forms represented by the CAD data before and after the design change (See FIGS. 3A and 3B). In FIG. 5, the surface of the metal mold before the design change is indicated by a dotted line 52, the surface of the metal mold after the design change is indicated by a solid line 50, and the difference model is indicated by a portion surrounded by the solid line 50 and dotted line 52 (i.e. a region indicated by chain lines).

In addition, a portion surrounded by a part of the surface of the difference model, which is indicated by the solid line 50, and a two-dot chain line 54, which is placed apart from the surface of the difference model by a predetermined width in the normal direction, represents the cutting allowance. That is, the cutting allowance is set by offsetting the difference model outside by a predetermined distance along the normal direction of the surface of the difference model. Then, the portion surrounded by the chain double-dashed line 54 and dotted line 52 represents the deposition region including the cutting allowance. Thus, by adding the cutting allowance to the difference model, the deposition region is specified.

Returning to the processing flow of FIG. 2, the deposition data generator 106 carries out a processing to specify the deposition layers by using the data of the deposition region (step S13). Though the details of the processing to specify the deposition layers will be later, as the processing result, data concerning each deposition layer is specified.

Next, the deposition data generator 106 judges whether or not the deposition is carried out automatically (step S15). Data used in this judgment may be preset or accepted at the step S1 as the input data.

If it is judged that it is automatically carried out (step S15: Yes route), the deposition data generator 106 outputs the data concerning each deposition layer to the automatic deposition data generator 110. Then, the automatic deposition data generator 110 retrieves the deposition type data storage 126 by using a code of the deposition type, which was accepted at the step S1, and specify the data of the deposition type (step S17). In this embodiment, there are two deposition types, and either of the deposition types is specified.

Figure 6A:
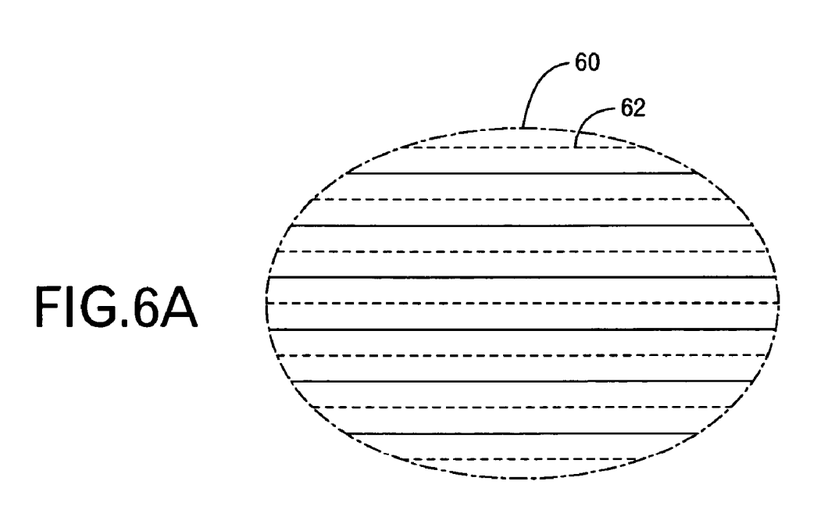
FIGS. 6A and 6B are conceptual diagrams showing deposition types.
Figure 6B:
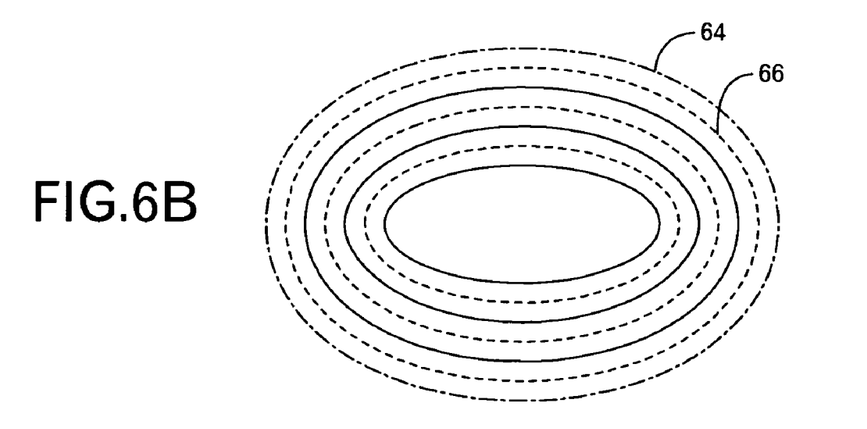

FIGS. 6A and 6B show conceptual figures of the deposition types, which can be designated in this embodiment. FIGS. 6A and 6B show a top view of one deposition layer. FIG. 6A shows an area 60 of one deposition layer, and deposition lines 62 represented by dotted lines. In addition, the boundaries between deposition stripes are represented by solid lines, and the distance between two adjacent solid lines means a deposition width. One or plural deposition lines 62 are set at predetermined deposition intervals (i.e. deposition pitch) in parallel, and in the actual deposition work, the deposition is carried out so as to put the center of the deposition width (i.e. interval) on the deposition line 62. That is, FIG. 6A shows an example of a first deposition type in which the deposition is carried out for the area 60 of one deposition layer in a stripe manner.

FIG. 6B shows an area 64 of one deposition layer, and deposition lines 66 represented by dotted lines. Boundaries between deposition rings are represented by solid lines and are set from the outside of the area 64 of one deposition layer, which is represented by the chain double-dashed line, toward the inside in a manner of rings having the same intervals. The distance between two adjacent boundaries means the deposition width. Moreover, the deposition lines 66 are set between the deposition boundaries in a ring manner. In the actual deposition work, the deposition is carried out so as to put the center of the deposition width on the deposition line 66. That is, FIG. 6B shows an example of a second deposition type in which the deposition is carried out for the area 64 of one deposition layer so as to draw rings having a predetermined width (i.e. deposition pitch or interval).

Thus, even when the deposition is carried out to the same area, either of different deposition types can be selected to carry out the deposition. Incidentally, according to the automatic deposition machine 130 to be used, the deposition type may be determined.

Returning to the processing flow of FIG. 2, the automatic deposition data generator 110 generates data to control the automatic deposition machine 130, such as data concerning the deposition lines (i.e. path), which includes position data, by using the data concerning each deposition layer and data of the automatic deposition type, and stores it into the automatic deposition data storage 128 (step S19). The automatic deposition machine 130 carries out a deposition processing using the data stored in the automatic deposition data storage 128.

On the other hand, at the step S15, if it is judged that it is not the automatic deposition (step S15: No route), the deposition data generator 106 outputs the data concerning each deposition layer to the deposition instruction diagram generator 108. The deposition instruction diagram generator 108 generates data for the deposition instruction diagram by using the data concerning each deposition layer to the output device 114. Then, the output device 114 outputs the deposition instruction diagram on a paper, for example, by using the data for the deposition instruction diagram, which was received from the deposition instruction diagram generator 108 (step S21). Incidentally, the deposition instruction diagram may be displayed on the display device 112.

Figure 7A:
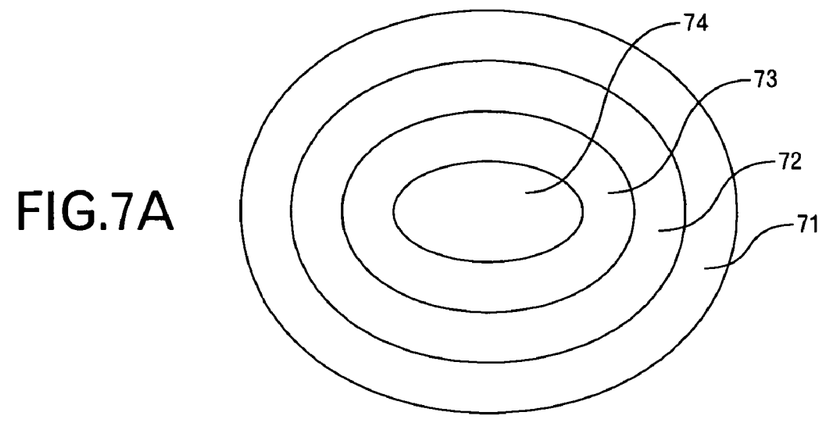
FIGS. 7A and 7B are diagrams showing examples of deposition instruction diagrams.
Figure 7B:
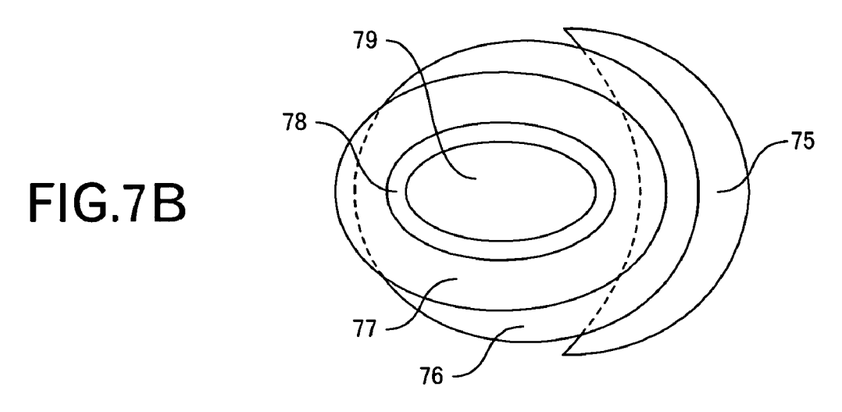

FIGS. 7A and 7B show examples of the deposition instruction diagrams. FIG. 7A shows a first deposition layer 71, second deposition layer 72, third deposition layer 73, and fourth deposition layer 74. In the actual deposition work, the deposition is carried out from the first deposition layer 71 so as to put layers on top of each other in turn. That is, FIG. 7A shows an example of the deposition instruction diagram corresponding to the first deposition type (See FIG. 4A) in which the deposition layers are put on top of each other from the surface of the metal mold before the design change in the normal direction.

FIG. 7B shows a first deposition layer 75, second deposition layer 76, third deposition layer 77, fourth deposition layer 78, and fifth deposition layer 79. In the actual deposition work, the deposition is carried out from the first deposition layer 75 so as to put layers on top of each other in turn. That is, FIG. 7B shows an example of the deposition instruction diagram corresponding to the second deposition type (See FIG. 4B) in which the deposition layers are put on top of each other horizontally.

Thus, even when the deposition is carried out for the same region, the deposition instruction diagram that enables a user to easily and appropriately grasp the deposition region according to the deposition type is output. Then, a person in charge of the deposition work carries out the deposition work according to the deposition instruction diagram.

According to this embodiment, it becomes possible to appropriately perform the deposition work caused by the design change of the object such as the metal mold.

Next, a processing to calculate the difference between the CAD data at the step S9 in FIG. 2 will be explained by using FIG. 8. First, the CAD data difference calculator 102 judges whether the deposition type indicated by the data (e.g. code) of the deposition type obtained at the step S1 of FIG. 2 represents the first deposition type (step S31 in FIG. 8). If it is judged that it represents the first deposition type (step S31: Yes route), the CAD data difference calculator 102 shifts (so called "offsets") the surface of the form represented by the CAD data before or after the design change, in the normal direction of the surface of the form represented by the reference CAD data, by a predetermined distance, in a scene in which the forms represented by the CAD data before and after the design change are superposed (step S33).

Figure 9:
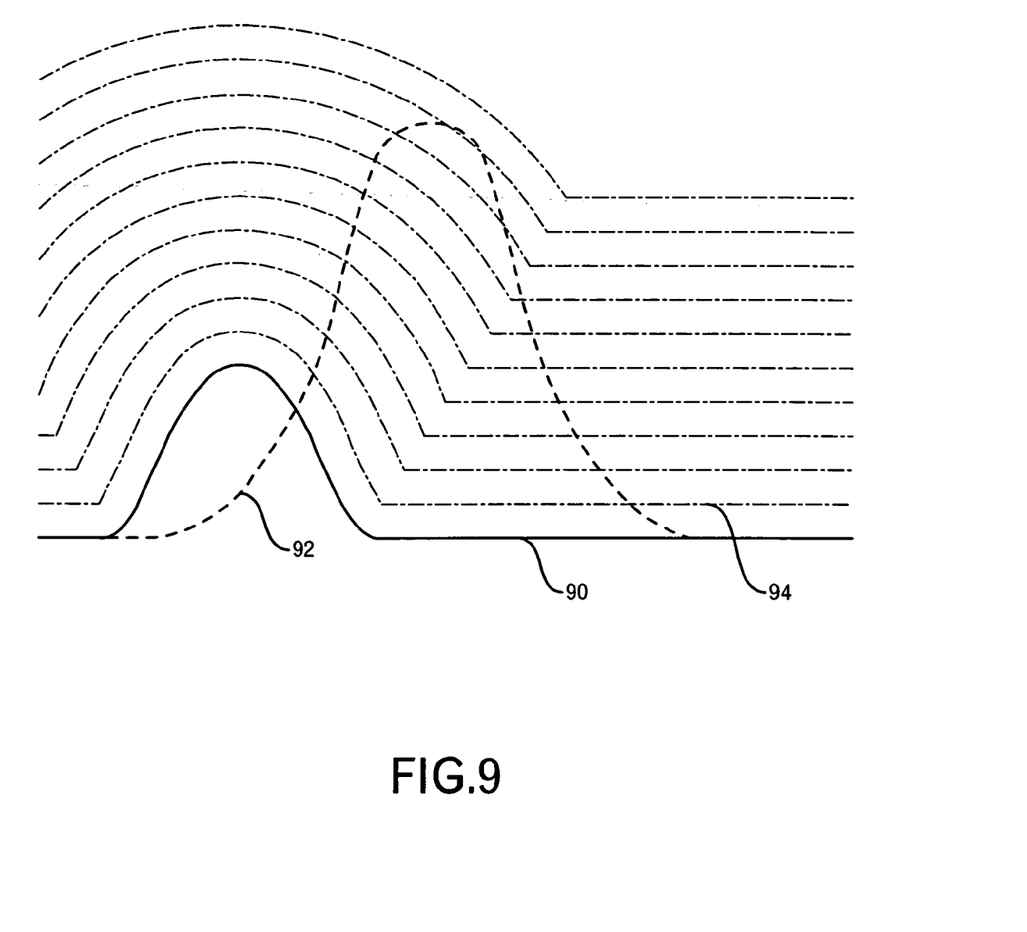
FIG. 9 is a conceptual diagram showing an offset processing in the normal direction.

FIG. 9 shows a conceptual figure of the offsetting in the normal direction. FIG. 9 shows a figure (i.e. cross section) that shows a state overlapping the forms represented by the CAD data before and after the design change. In an example of FIG. 9, the surface of the metal mold before the design change is indicated by a solid line 90, the surface of the metal mold after the design change is indicated by a dotted line 92, and a portion surrounded by the solid line 90 and the dotted line 92 represents a difference due to the design change. Incidentally, a portion in which the solid line 90 is higher than the dotted line 92 is a subject of the cutting, and is not a subject of a processing for obtaining the difference model for the deposition in this embodiment.

Moreover, in the example of FIG. 9, the CAD data before the design change is reference CAD data, and the CAD data after the design change is counterpart CAD data. Therefore, a chain line 94 indicates a form in which the form represented by the CAD data before the design change, which is shown by the solid line 90, is offset in the normal direction of the surface of the form by a predetermined width. The forms after the offsetting, which are indicated by the chain lines 94, are generated from the lower level toward the upper level of this figure in turn in this embodiment. Incidentally, the offset width is set to a value, which is the same as or smaller than an allowable error in the form.

Figure 8:
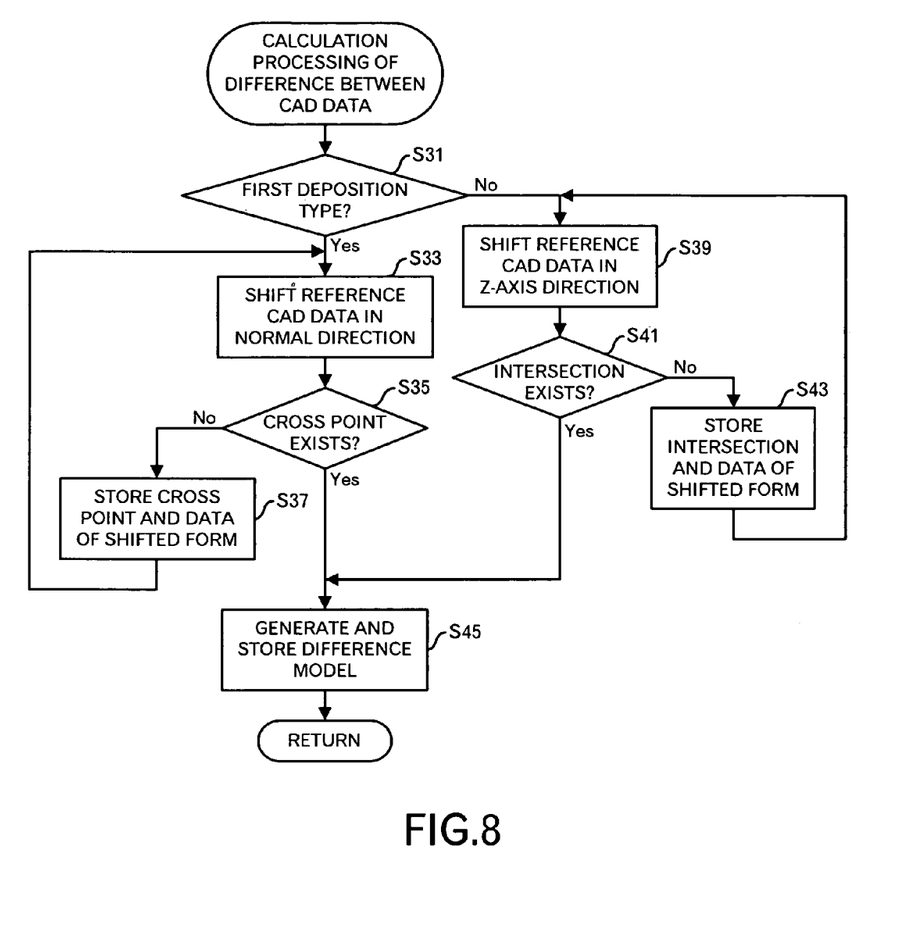
FIG. 8 is a diagram showing a processing flow of difference calculation between CAD data.

Returning to the processing flow of FIG. 8, for example, in a case where the CAD data before the design change is reference CAD data, the CAD data difference calculator 102 judges whether a portion exists in which the surface of the form after the design change, which is represented by the counterpart CAD data, is higher than the surface of the form after the offsetting, that is, whether a cross point between the chain line 94 representing the surface of the form after the offsetting in the example of FIG. 9 and the dotted line 92 representing the surface of the form after the design change exists (step S35). If it is judged that the cross point exists, the CAD data difference calculator 102 temporarily stores the cross point and the form data after the offsetting into the storage device (step S37). Then, the processing returns to the step S33, and the CAD data difference calculator 102 further offsets the surface of the form represented by the reference CAD data along the normal direction.

Thus, the processing at the step S33 and S37 is repeated until it is judged that any cross point does not exist at the step S35. Then, if it is judged that any cross point does not exist at the step S35 (step S35: Yes route), the CAD data difference calculator 102 generates the difference model data by using the intersections and the form data after the shifting, which are stored in the storage device at the step S37 (step S45).

On the other hand, if it is judged at the step S31 that it does not represent the first deposition type (step S31: No route), the CAD data difference calculator 102 shifts the surface of the form represented by the CAD data before or after the design change, which is treated as reference CAD data, in the Z-axis direction (i.e. vertically upper direction against the reference plane, which is a horizontal plane, for example), by a predetermined distance in a scene in which the forms represented by the CAD data before and after the design change are superposed (step S39).

Figure 10:
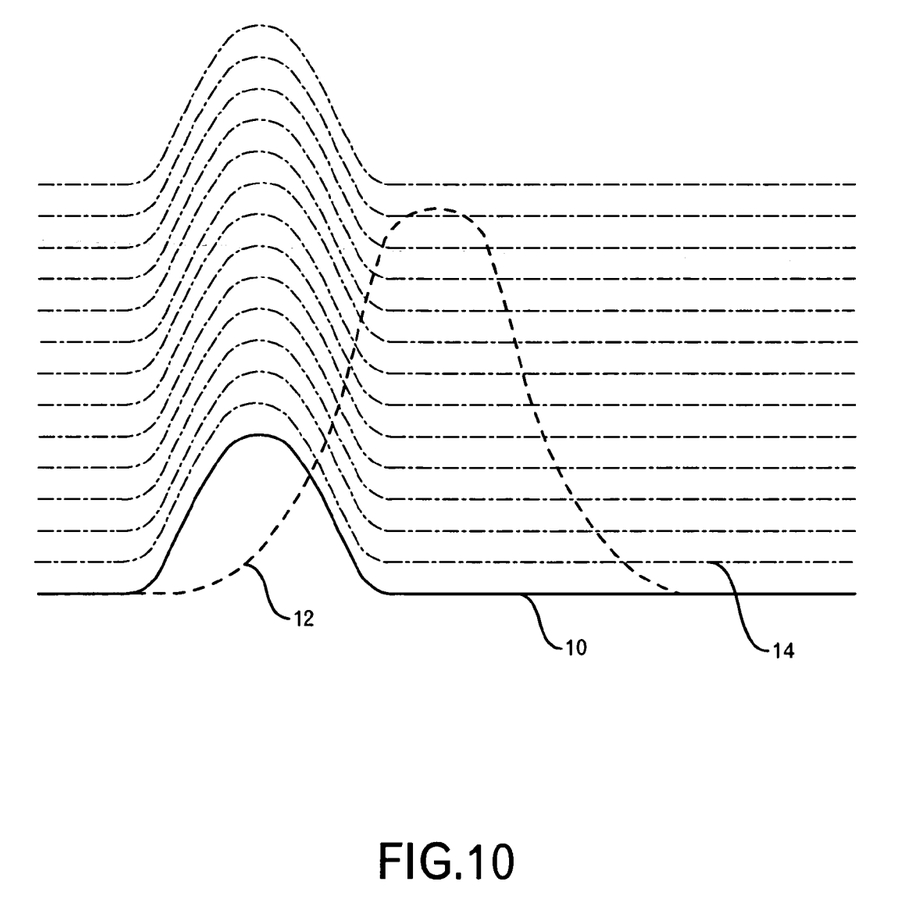
FIG. 10 is a conceptual diagram showing a shift processing in the Z-axis direction.

FIG. 10 shows a conceptual figure of the shifting in the Z-axis direction. FIG. 10 shows a figure (i.e. cross section) that represents a state overlapping the forms represented by the CAD data before and after the design change. In an example of FIG. 10, the surface of the metal mold before the design change is indicated by a solid line 10, the surface of the metal mold after the design change is indicated by a dotted line 12, and a portion surrounded by the solid line 10 and dotted line 12 represents a difference due to the design change. Incidentally, a portion in which the solid line 10 is higher than the dotted line 12 is a subject of the cutting, and is not a subject of a processing for obtaining the difference model for the deposition in this embodiment.

Moreover, in the example of FIG. 10, the CAD data before the design change is reference CAD data, and the CAD data after the design change is counterpart CAD data. Therefore, a dashed line 14 shows a form in which the surface of the form represented by the CAD data before the design change, which is indicated by the solid line 10, is shifted in the Z-axis direction by a predetermined width. The forms after the shifting, which are indicated by the chain lines 14, are generated from the lower level toward the upper level of this figure in turn in this embodiment. Incidentally, the shifting width is set to a value, which is the same as or smaller than an allowable error in the form.

Returning to the processing flow of FIG. 8, for example, in a case where the CAD data before the design change is reference CAD data, the CAD data difference calculator 102 judges whether a portion exists in which the surface of the form after the design change, which is represented by the counterpart CAD data, is higher than the surface of the reference form after the shifting, that is, whether an intersection between the chain line 94 representing the form after the shifting in the example of FIG. 10 and the dotted line 92 representing the form after the design change exists (step S41). If it is judged that the intersection exists (step S41: No route), the CAD data difference calculator 102 temporarily stores the intersection and the form data after the shifting into the storage device (step S43). Then, the processing returns to the step S39, and the CAD data difference calculator 102 further shifts the surface of the form represented by the reference CAD data along the Z-axis direction.

Thus, the processing at the step S39 and S43 is repeated until it is judged that any intersection does not exist at the step S41. Then, if it is judged at the step S41 that any cross point does not exist (step S41: Yes route), the CAD data difference calculator 102 generates the difference model data by using the cross points and the form data after the shifting, which are stored in the storage device at the step S43 (step S45).

As described above, for example, according to either of the two methods, the calculation processing of the difference between the CAD data is carried out. Incidentally, the generated difference model data is output to the cutting allowance addition processor 104 as the processing result of the CAD data difference calculator 102.

Next, a processing to specify the deposition layer at the step S13 of FIG. 2 will be explained using FIG. 11. First, the deposition data generator 106 retrieves the maximum deposition amount data storage 122 by using the material data obtained at the step S1 of FIG. 2, and specifies the maximum deposition amount of one deposition in a case where the designated deposition material is used (step S51 in FIG. 11).

Then, the deposition data generator 106 judges whether data (e.g. a code) of the deposition type obtained at the step S1 of FIG. 2 represents the first deposition type (step S53). If it is judged that it represents the first deposition type (step S53: Yes route), the deposition data generator 106 generates data concerning the area of the deposition layer, which has a form in which the difference model with the cutting allowance is sliced by the maximum deposition amount (i.e. thickness) specified at the step S51 (step S55). Here, since it represents the first deposition type, the difference model (See FIG. 9) that was generated by the offsetting in the normal direction, which was explained at the step S33 of FIG. 8, and to which the cutting allowance is added, is used as a form to be sliced. Then, by using a method for slicing the difference model with the cutting allowance by a thickness based on the amount of one deposition according to the forms offset in the normal direction as explained at the step S33 of FIG. 8, it is divided into one or plural deposition layers.

Then, the deposition data generator 106 maps area data of each deposition layer to the CAD data before the design change, and specifies position data of the area to be actually deposited and the like (step S57).

Figure 12:
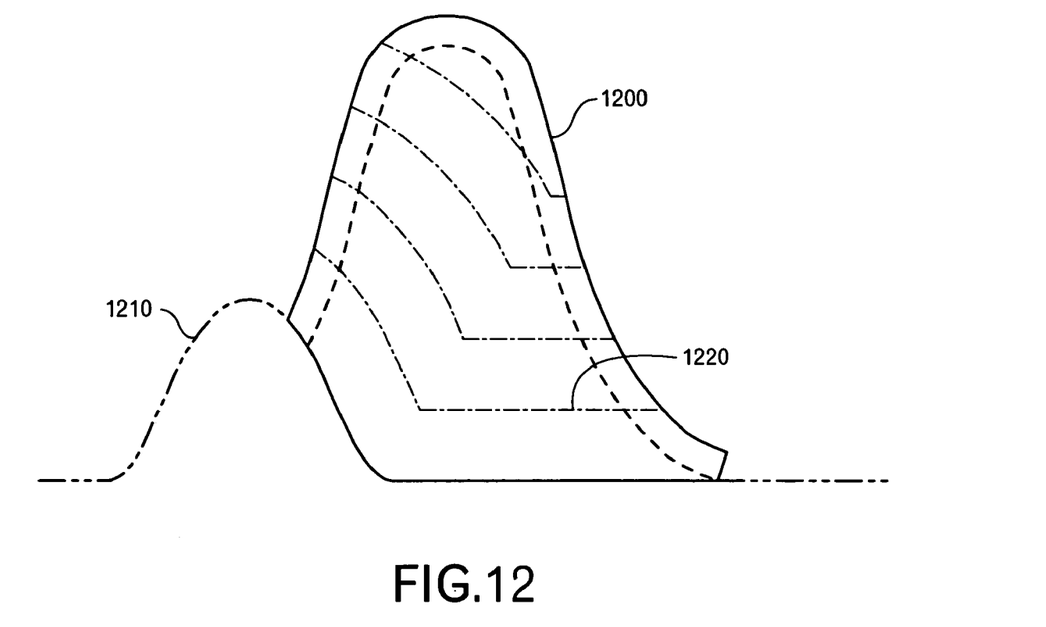
FIG. 12 is a conceptual diagram showing deposition layers in a first deposition type.

FIG. 12 shows a conceptual figure of the deposition layers in the first deposition type. FIG. 12 is a figure (i.e. cross section) that shows a state overlaying the form represented by the CAD data before the design change and the forms represented by the area data of the deposition layers. The surface of the metal mold before the design change is indicated by a chain double-dashed line 1210, and a portion surrounded by a solid line 1200 represents the difference mode with the cutting allowance (see FIG. 9). Then, boundaries between layers generated by slicing the difference model, that is, sections are indicated by chain lines 1220. Thus, in case of the first deposition type, the slicing processing is carried out by using the data of the offsetting in the normal direction, which is included in the difference model.

Figure 11:
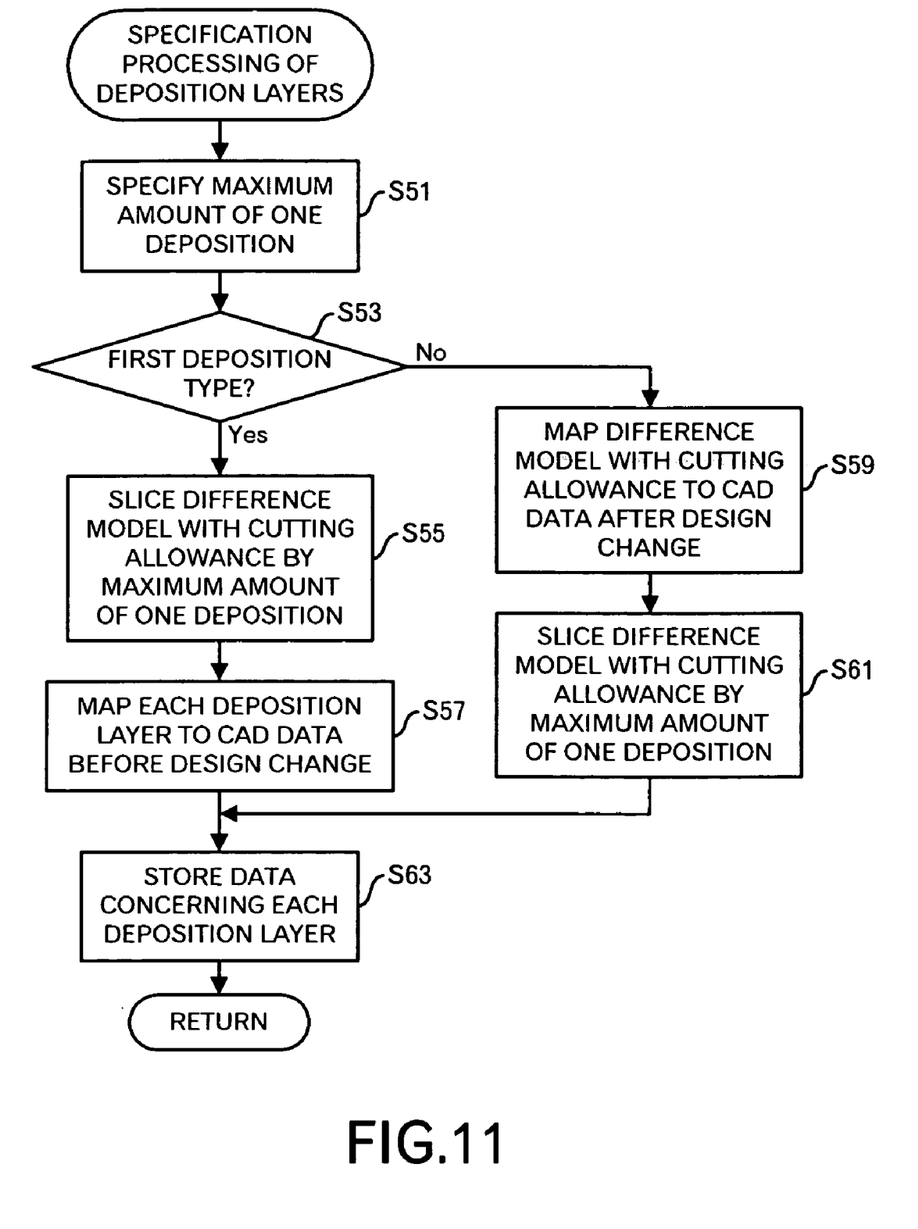
FIG. 11 is a diagram showing a processing flow of deposition layer specification.

Returning to the processing flow in FIG. 11, the deposition data generator 106 temporarily stores the data concerning each deposition layer into the storage device (step S63).

On the other hand, if it is judged at the step S53 that it does not represent the first deposition type, the deposition data generator 106 maps the difference model with the cutting allowance to the CAD data after the design change, and specifies position data of the area to be deposited and the like (step S59). Here, since it represents the second deposition type, the difference model (See FIG. 10) that is generated by the shifting in the Z-axis direction, and to which the cutting allowance is added, is used as a form to be mapped.

Then, the deposition data generator 106 generates data concerning the area of the deposition layer, which has a form sliced by the maximum deposition amount (i.e. thickness) specified at the step S51 (step S61). That is, by using a method for slicing the difference model with the cutting allowance by a thickness based on the amount of one deposition in parallel to the reference plane, which is a horizontal plane, for example, it is divided into one or plural deposition layers.

Figure 13:
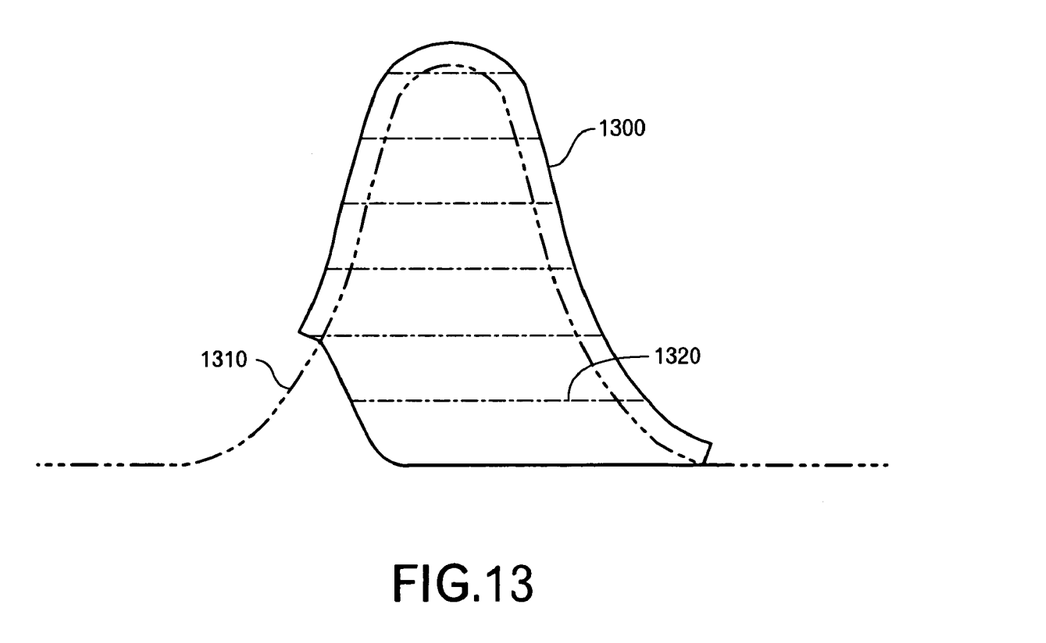
FIG. 13 is a conceptual diagram showing deposition layers in a second deposition type.

FIG. 13 shows a conceptual figure of the deposition layers in the second deposition type. FIG. 13 is a figure (i.e. cross section) that shows a state superposing the form represented by the CAD data after the difference model and the difference model (See FIG. 10) generated by the shifting in the Z-axis direction. The surface of the metal mold after the design change is indicated by a chain double-dashed line 1310, and the difference model with the cutting allowance is represented by a portion surrounded by the solid line 1300. Then, boundaries between layers generated by slicing the difference model, that is, sections are indicated by dashed lines 1320. Thus, in case of the second deposition type, the slicing processing is carried out in parallel to the reference plane such as the horizontal plane.

The difference model generated by the shifting in the Z-axis direction is used, since the necessary computational volume is smaller, compared with a case in which the difference model is generated by the offsetting in the normal direction. Therefore, the difference model generated by the offsetting in the normal direction may be sliced in parallel to the reference plane such as the horizontal plane.

Returning to the processing flow of FIG. 11, the deposition data generator 106 temporarily stores the data concerning each deposition layer (step S63).

Thus, the data concerning each deposition layer is specified. Incidentally, the specified data concerning each deposition layer is output to the deposition instruction diagram generator 108 or automatic deposition data generator 110 as the processing result of the deposition data generator 106.

Though one embodiment of this invention was explained, this invention is not limited to this embodiment. For example, the functional block diagram of the deposition data generation apparatus 100 shown in FIG. 1 is one example, and the program modules corresponding to the functional blocks may not be created. In addition, the deposition data generation apparatus 100 is configured by not only one computer, but also a plurality of computers. Similarly, a plurality of display devices 112, output devices 114 and automatic deposition machines 130 may exist.

Incidentally, in the aforementioned embodiment, an example of the metal mold machining was explained, but the application of this invention is not limited to the metal mold, and the technology of this invention is applicable to the machining of other objects for which the deposition due to the design change may occur.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method for deposition, comprising:

calculating a difference between three dimensional data representing a form of an object before a design change and three dimensional data representing a form of said object after said design change; and generating deposition data for a shortage portion in said form of said object before said design change by using the calculated difference data, when cutting said object to make said form after said design change.

2. The information processing method as set forth in claim 1, wherein said generating comprises calculating a deposition region including a cutting allowance calculated based on the difference data.

3. The information processing method as set forth in claim 1, wherein said generating comprises calculating a region of one or a plurality of deposition layers based on an attribute of a deposition material.

4. The information processing method as set forth in claim 3, wherein said calculating a region comprises calculating a region of one or a plurality of deposition layers according to a deposition method in which said deposition layers are put on top of each other from a surface of said object before said design change in a normal direction.

5. The information processing method as set forth in claim 3, wherein said calculating a region comprises calculating a region of one or a plurality of deposition layers according to a deposition method in which said deposition layers are put on top of each other in parallel to a specific reference plane.

6. The information processing method as set forth in claim 1, further comprising:
generating data concerning deposition instruction diagram based on said deposition data.

7. The information processing method as set forth in claim 1, further comprising:
generating data for an automatic deposition machine based on said deposition data.

8. The information processing method as set forth in claim 3, wherein said generating further comprises calculating deposition path data for said region of said deposition layer according to a deposition method in which the deposition is carried out in parallel by a predetermined deposition width.

9. The information processing method as set forth in claim 3, wherein said generating further comprises calculating deposition path data for said region of said deposition layer according to a deposition method in which the deposition is carried out to configure a ring with a predetermined width.

10. The information processing method as set forth in claim 1, wherein said calculating comprises:
generating a surface apart from a surface of said object before said design change in a normal direction of said surface of said object before said design change by a first predetermined distance; and
calculating an intersection between the generated surface and a surface of said object after said design change.

11. The information processing method as set forth in claim 1, wherein said calculating comprises:
generating a surface by moving a surface of said object before said design change in a vertical direction of a specific plane by a second predetermined distance; and
calculating a cross point between the generated surface and a surface of said object after said design change.

12. A program embodied on a medium for causing a computer to execute an information processing for deposition, comprising:
calculating a difference between three dimensional data representing a form of an object before a design change and three dimensional data representing a form of said object after said design change; and
generating deposition data for a shortage portion in said form of said object before said design change by using the calculated difference data, when cutting said object to make said form after said design change.

13. The program as set forth in claim 12, wherein said generating comprises calculating a deposition region including a cutting allowance calculated based on the difference data.

14. The program as set forth in claim 12, wherein said generating comprises calculating a region of one or a plurality of deposition layers based on an attribute of a deposition material.

15. The program as set forth in claim 14, wherein said calculating a region comprises calculating a region of one or a plurality of deposition layers according to a deposition method in which said deposition layers are put on top of each other from a surface of said object before said design change in a normal direction.

16. The program as set forth in claim 14, wherein said calculating a region comprises calculating a region of one or a plurality of deposition layers according to a deposition method in which said deposition layers are put on top of each other in parallel to a specific reference plane.

17. The program as set forth in claim 12, further comprising:
generating data concerning deposition instruction diagram based on said deposition data.

18. The program as set forth in claim 12, further comprising:
generating data for an automatic deposition machine based on said deposition data.

19. The program as set forth in claim 14, wherein said generating further comprises calculating deposition path data for said region of said deposition layer according to a deposition method in which the deposition is carried out in parallel by a predetermined deposition width.

20. The program as set forth in claim 14, wherein said generating further comprises calculating deposition path data for said region of said deposition layer according to a deposition method in which the deposition is carried out to configure a ring with a predetermined width.

21. The program as set forth in claim 12, wherein said calculating comprises:
generating a surface apart from a surface of said object before said design change in a normal direction of said surface of said object before said design change by a first predetermined distance; and
calculating an intersection between the generated surface and a surface of said object after said design change.

22. The program as set forth in claim 12, wherein said calculating comprises:
generating a surface by moving a surface of said object before said design change in a vertical direction of a specific plane by a second predetermined distance; and
calculating a cross point between the generated surface and a surface of said object after said design change.

23. An information processing apparatus for deposition, comprising:
means for calculating a difference between three dimensional data representing a form of an object before a design change and three dimensional data representing a form of said object after said design change; and
means for generating deposition data for a shortage portion in said form of said object before said design change by using the calculated difference data, when cutting said object to make said form after said design change.

24. The information processing apparatus as set forth in claim 23, wherein said means for generating comprises means for calculating a deposition region including a cutting allowance calculated based on the difference data.

25. The information processing apparatus as set forth in claim 23, wherein said means for generating comprises means for calculating a region of one or a plurality of deposition layers based on an attribute of a deposition material.

26. The information processing apparatus as set forth in claim 25, wherein said means for calculating a region comprises means for calculating a region of one or a plurality of deposition layers according to a deposition method in which said deposition layers are put on top of each other from a surface of said object before said design change in a normal direction.

27. The information processing apparatus as set forth in claim 25, wherein said means for calculating a region comprises means for calculating a region of one or a plurality of deposition layers according to a deposition method in which said deposition layers are put on top of each other in parallel to a specific reference plane.

28. The information processing apparatus as set forth in claim 23, further comprising:
   means for generating data concerning deposition instruction diagram based on said deposition data.

29. The information processing apparatus as set forth in claim 23, further comprising:
   means for generating data for an automatic deposition machine based on said deposition data.

30. The information processing apparatus as set forth in claim 25, wherein said means for generating further comprises means for calculating deposition path data for said region of said deposition layer according to a deposition method in which the deposition is carried out in parallel by a predetermined deposition width.

31. The information processing apparatus as set forth in claim 25, wherein said means for generating further comprises means for calculating deposition path data for said region of said deposition layer according to a deposition method in which the deposition is carried out to configure a ring with a predetermined width.

32. The information processing apparatus as set forth in claim 23, wherein said means for calculating comprises:
   means for generating a surface apart from a surface of said object before said design change in a normal direction of said surface of said object before said design change by a first predetermined distance; and
   means for calculating an intersection between the generated surface and a surface of said object after said design change.

33. The information processing apparatus as set forth in claim 23, wherein said means for calculating comprises:
   means for generating a surface by moving a surface of said object before said design change in a vertical direction of a specific plane by a second predetermined distance; and
   means for calculating a cross point between the generated surface and a surface of said object after said design change.

* * * * *